Sept. 17, 1968  V. A. HORDIS  3,402,038
APPARATUS FOR HEATING AND TEMPERING GLASS SHEETS
Filed April 2, 1965  2 Sheets-Sheet 1

INVENTOR.
VICTOR A. HORDIS
BY Busser Smith & Harding
ATTORNEY.

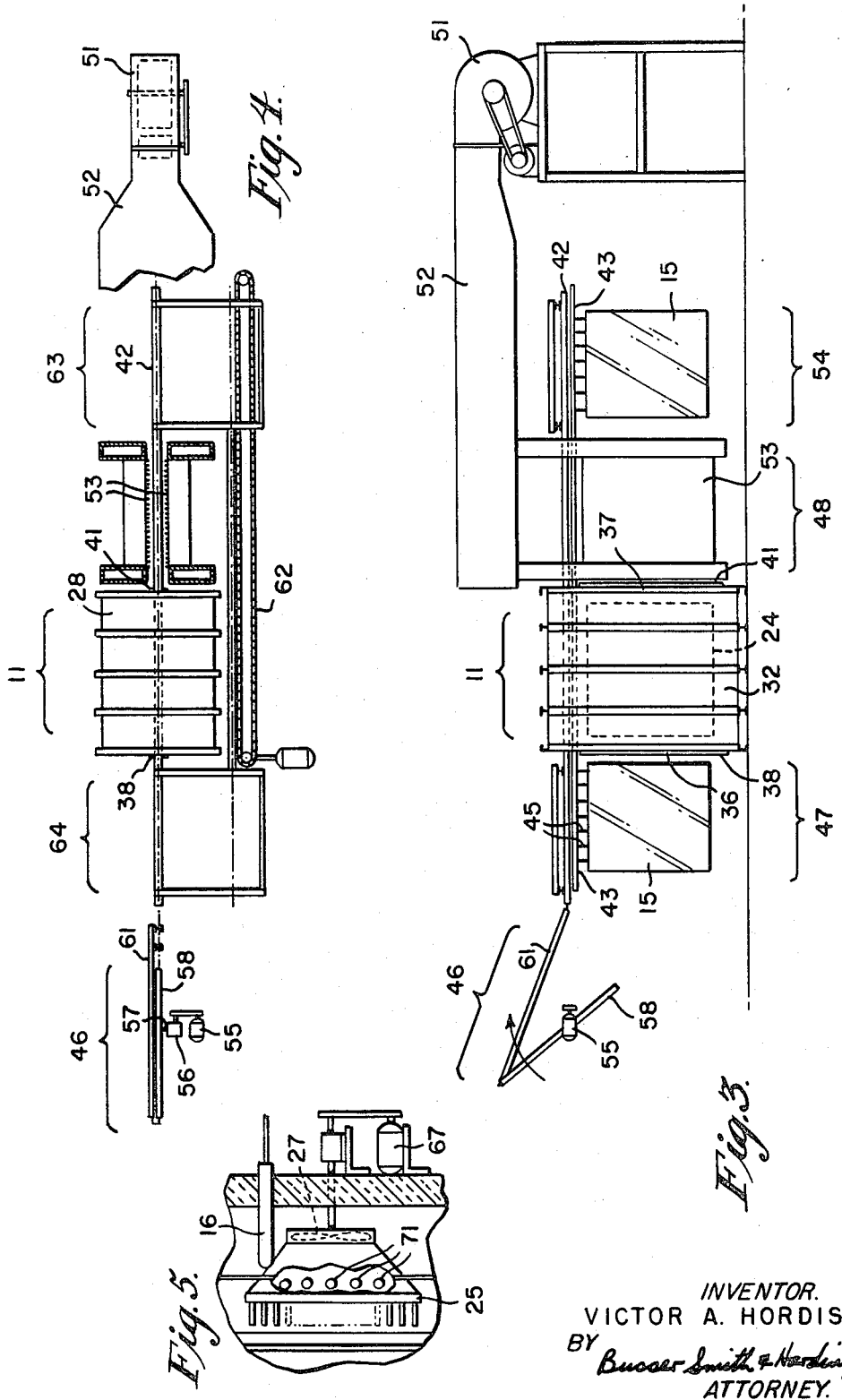

United States Patent Office 3,402,038
Patented Sept. 17, 1968

3,402,038
APPARATUS FOR HEATING AND TEMPERING GLASS SHEETS
Victor A. Hordis, Riverton, N.J., assignor to Hordis Bros., Inc., Pennsauken, N.J., a corporation of Pennsylvania
Filed Apr. 2, 1965, Ser. No. 445,103
17 Claims. (Cl. 65—350)

ABSTRACT OF THE DISCLOSURE

Apparatus for tempering a glass sheet, a conveyor track, four racks which ride the conveyor track and carry a sheet of glass, a loading station where a sheet of glass is attached to one of the racks, an oven station where the sheet of glass is heated to a tempering temperature, a quenching station where the glass is suddenly chilled by cool air, and an unloading station where the temperature glass sheet is removed from the rack, and pusher means for pushing the racks from one station to the next along the conveyor track. The pusher means includes a crank and a pusher arm which pushes the racks from station to station with nearly uniform acceleration and deceleration. The racks are returned from the unloading station to the loading station by a cross-over conveyor, a return conveyor, and another cross-over conveyor. The oven includes opposed plenum chambers having a multiplicity of tubes through which hot air is blown on each side of the glass sheet by a fan. A heat sensor controls the temperature of the air in the plenum chambers.

This invention relates to improvements in an apparatus for tempering glass, and more particularly concerns an oven for heating glass to a tempering temperature, and the overall apparatus for tempering a glass sheet including loading, oven, quenching, and unloading stations and conveyor for transporting the glass sheets through the stations.

The problem in heating large sheets of glass to a uniform temperature is unique because of the nature of glass. The temperature to which it must be raised for tempering is above the softening point. This means that handling of the glass from the furnace into the quench must be carefully done to avoid distorting the now plastic sheet of glass.

The fact that the glass must be raised to a temperature at which it becomes plastic necessitates raising the entire sheet uniformly and rapidly to the correct temperature. Otherwise sections that reach plasticity too early tend to distort and become wavy.

When heating a sheet of glass, vertically in a furnace, there is a natural convection current set up on each side of the glass by the cold air adjacent to the glass flowing downward. This effect, in large sheets, makes it extremely difficult to correctly heat the bottom of the sheet by radiation alone because of the magnitude of the cooling convection current flowing down the glass surfaces.

Accordingly, it is an object of this invention to provide apparatus for tempering glass which overcomes the foregoing problems of the prior art, and heats a glass sheet to tempering temperature in a uniform manner.

It is another object of the invention to provide tempering apparatus having a conveyor system which is relatively compact, and uses fewer frames or conveyor racks for suspending glass sheets, than are used by conventional conveyor systems.

It is another object to provide tempering apparatus which has means for moving the glass sheets smoothly so as to avoid any distortion of the hot glass caused by the manner in which it is moved through the apparatus.

It is another object of the invention to provide tempering apparatus which holds large thin sheets of glass in vertical position and heats them uniformly in a short period of time.

It is another object of the invention to provide tempering apparatus which adjusts automatically to heat glass sheets of various sizes to the proper tempering temperature.

Other objects and advantages of this invention, including its simplicity and economy, will further become apparent hereinafter and in the drawings in which:

FIG. 3 is a view in side elevation of tempering apparatus constructed in accordance with this invention, including the oven of FIGS. 1 and 2;

FIG. 4 is a view in top plan of the apparatus of FIG. 3, and

FIG. 5 is a partial view in cross section, similar to FIG. 2, of another embodiment of the invention illustrating a different heating source.

Figure 1:
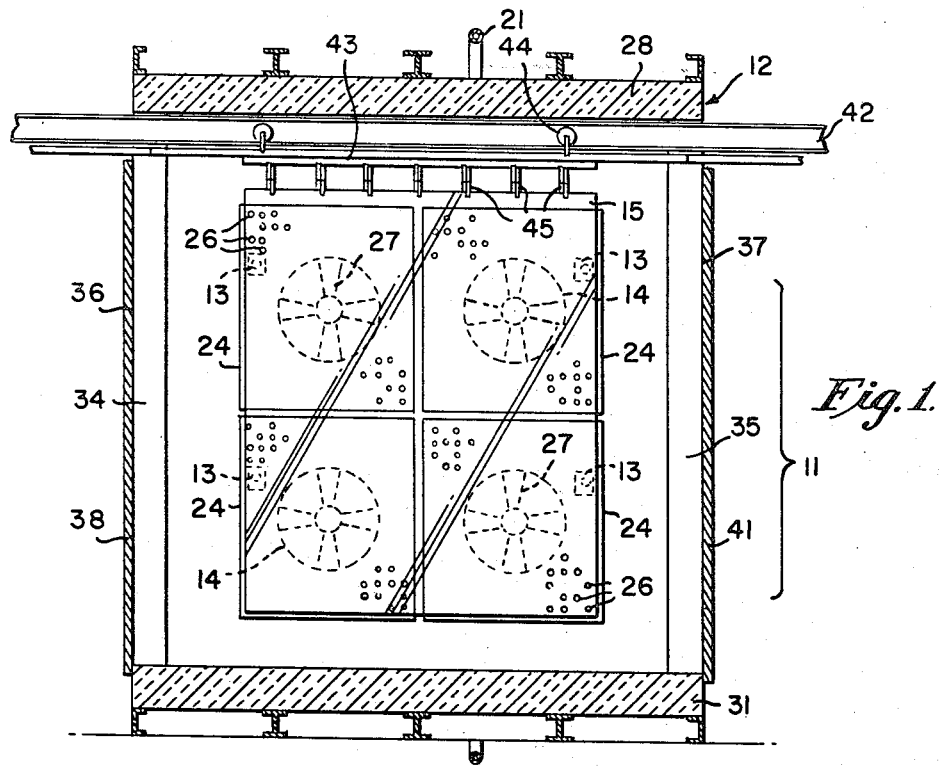
FIG. 1 is a view in vertical longitudinal section of an oven constructed in accordance with this invention.

Although specific terms are used in the following description for clarity, these terms are intended to refer only to the structure shown in the drawings and are not intended to define or limit the scope of the invention.

Turning now to the specific embodiment of the invention selected for illustration in the drawings, there is shown an oven 11 for heating glass to a tempering temperature, which comprises a casing structure 12, burner means 13 which are mounted in casing structure 12 and generate heat therein, and fan means 14 for generating forced air currents which are heated by burner means 13 and which apply the heat uniformly to a glass sheet 15 to heat it to a tempering temperature.

A temperature control means is provided for sensing the temperature of the heated forced air currents and for regulating the temperature of the currents in each duct, to insure that the glass sheet 15 is heated evenly across its length and breadth. The temperature control means includes a sensor 16 which is positioned within oven 11 and is connected to a temperature controller 17 located outside the oven 11. Controller 17 operates a temperature control valve 18 in gas line 21 which feeds fuel to burner means 13.

Fan means 14 includes a pair of opposed and spaced apart plenum chambers 22, 23. Four such pairs of chambers are illustrated in the drawings, but it will be realized that any number may be used. The chambers 22, 23 include a metal hood or plenum 24 which has a tube plate 25 having a multiplicity of tubes 26 mounted on the front. A fan propeller 27 is rotatably mounted in the rear of each plenum chamber 22, 23 and is adapted to force air currents, indicated by the arrows, and heated by burner means 13, through tubes 26 to impinge upon and apply heat uniformly to a glass sheet 15 which is positioned between two tube plates 25. Tubes, rather than perforated plates, must be used to allow a free path for the air being scavenged off of the glass surface to escape and find its way back to the fan without interferring with the jets striking the glass. The hot air heats the glass sheet 15 to a tempering temperature. The air currents leave glass sheet 15 and follow a return path, indicated by the arrows, past burner means 13 where it is re-heated. The re-heated air is forced again by fan 27 through the plenum chambers and tubes 26 to again strike against glass 15.

Casing structure 12 has interior walls made of insulating refractory material including top wall 28, bottom wall 31, front wall 32, rear wall 33 and side walls 34, 35. The walls are provided with a dust free refractory lining or a stainless steel liner, or any other suitable wall material.

An entrance slot 36 is formed in the center of side wall 34, and an exit slot 37 is formed in the center of side wall 35. A sliding door 38 is provided to cover entrance slot 36 when glass sheet 15 is passed therethrough, and a sliding door 41 is provided for opening and closing exit slot 37.

A conveyor track 42 is suspended from top wall 28 of casing structure 12, and a movable rack 43 is supported on track 42 by a plurality of rollers or wheels 44 which ride in the track. A plurality of tongs 45 extend downwardly from said rack 43 and are adapted to grasp and hold in suspension a sheet of glass 15. A pusher mechanism 46 is provided for pushing the racks 43 and glass sheets 15 into and out of oven station 11 with approximately uniform acceleration and deceleration so as to avoid any variations in the hot glass caused by jerky movement through the tempering apparatus.

Figure 2:
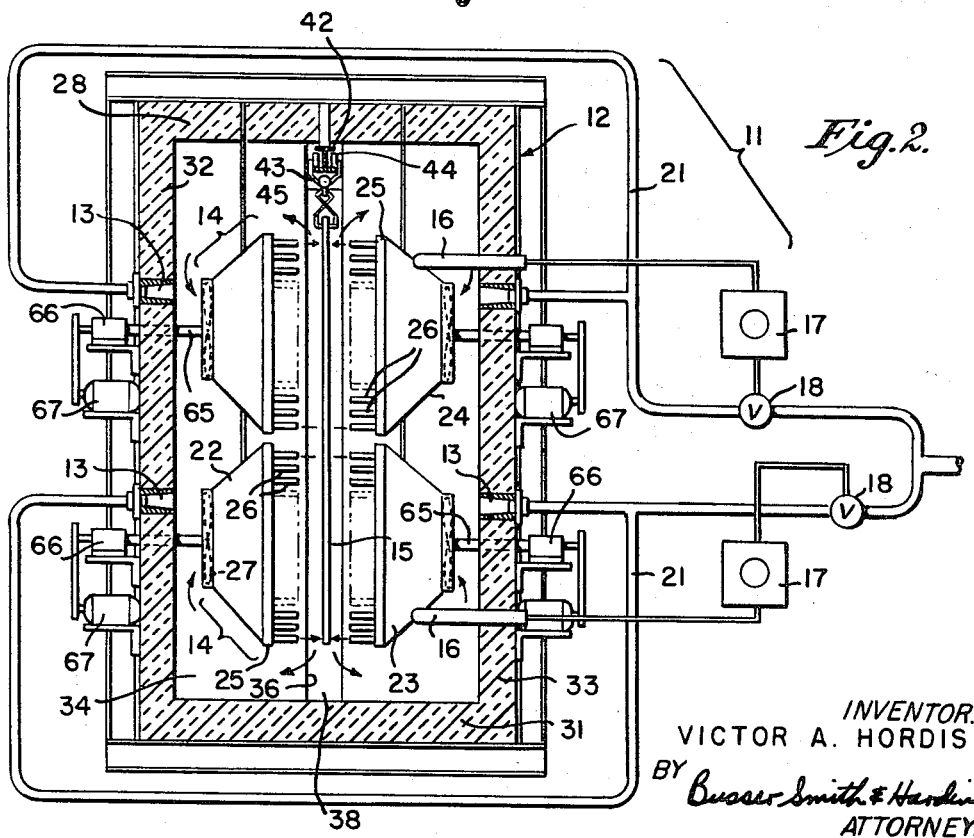
FIG. 2 is a view in cross section of the oven shown in FIG. 1.

FIGS. 1 and 2 illustrate gas fired burners as the burner means 13. However, it will be realized that burner means 13 may be gas fired, or oil fired burners, or may be electric heating elements. Burner means 13 supply heat to the air stream and the flame from the burners does not strike glass sheet 15. Sensor 16 may be a thermocouple, and only one sensor 16 is needed for each pair of opposed plenum chambers 22, 23. Opposed plenum chambers are controlled by the same temperature controller 17 to insure that the temperature is the same on both sides of glass sheet 15.

Referring now more particularly to FIGS. 3 and 4, there is shown the overall apparatus for tempering a glass sheet which comprises a conveyor track 42, and a plurality of movable racks 43 which ride along conveyor track 42 and have means, such as tongs 45, for carrying a sheet of glass. A loading station 47 is provided at one end of conveyor track 42, and this is the station where a sheet of glass 15 is attached to one of the racks 43. An oven station, which includes oven 11, is positioned next to loading station 47 and is the station wherein the sheet of glass is heated to a tempering temperature of about 1200° F. and above.

Quenching station 48 is situated next in line and is the station wherein the heated sheet of glass from the oven 11 is suddenly chilled by cool air which is applied thereto. The cool air is generated by a blower 51 and passes through an air chute 52 to a pair of cooler tube plates 53 which are opposed to each other so that the glass sheet must pass therebetween.

An unloading station 54 is located next to quenching station 48 and here the tempered and cooled glass sheet is removed from its rack 43.

Pusher means 46, which pushes rack 43 along conveyor track 42 in a smooth but intermittent fashion, comprises a motor 55 which is connected to a gear box 56 having a shaft 57 extending therefrom which is keyed to a crank 58. Crank 58 is pivotally connected to an end of a pusher arm 61. The other end of pusher arm 61 pushes the racks 43 along from one station to the next on the conveyor track 42, and pushes the racks with accelerated and decelerated motion in order to avoid distortions caused by irregular or abrupt motion.

The apparatus of FIGS. 3 and 4 includes a return conveyor 62 which is of the power-driven endless-chain type that returns each rack 43 from unloading station 54 to loading station 47. A crossover conveyor 63 extends between unloading station 54 and one end of return conveyor 62, and another crossover conveyor 64 extends between the other end of return conveyor 62 and loading station 47.

In operation, a glass sheet 15 is attached to a movable rack 43 by tongs 45 in loading station 47. Then pusher mechanism 46 is actuated to push rack 43 into oven 11, with the rack 43 which is entering the oven simultaneously pushing out of oven 11 the rack which preceded it therein.

While in oven 11, glass sheet 15 is subjected to hot air which has been heated by burner means 13 and forced by fan propellers 27 through plenum chambers 22, 23 and tubes 26 to strike both sides of glass sheet 15 in a uniform manner. Fan propellers 27 are driven by shafts 65 which are mounted in bearings 66 and driven by motors 67.

When the glass sheet 15 enters oven 11, it chills tube plates 25 and tubes 26 which up until that time have been glowing hot. The sensors 16 sense this chill in the oven and raise the input of heat by increasing the amount of fuel being fed to burner means 13. This is done through the action of temperature controllers 17 which actuate temperature control valves 18 to feed a greater amount of fuel to burner means 13. The burners heat the air, and the hot air heats the sheet of glass, in addition to radiation from the hot metal heating the glass.

The hot air from tubes 26 strike glass sheet 15 in a uniform fashion and bounce away from the sheet and return to the rear of plenum chambers 22, 23 in a current path which is indicated by the arrows. In the course of this path, the air goes past burner means 13 to be reheated and is then again projected by fan propellers 27 through the plenum chambers and tubes.

After the glass sheet within oven 11 has reached the proper tempering temperature, it is pushed out of oven 11 to quenching station 48 where it is subjected to a quenching blast of cool air which is uniformly distributed on both sides of the glass sheet. Then the glass sheet is pushed to unloading station 54 where it is removed from its rack 43 and is ready for shipment.

Rack 43 is moved over crossover conveyor 63 to one end of return conveyor 62 which picks it up and returns it to a crossover conveyor 64, on which it is moved to loading station 47.

The conveyor system of the present invention is automatic and is push-button operated. It uses fewer movable racks 43 than would be required in a conventional chain type monorail continuous conveyor system. In the present invention four racks 43 are used: one at the loading station; one in the oven; one in the quenching station; and one being returned from the unloading station to the loading station. In the conventional continuous chain type monorail conveyor, ten or more of such racks would be necessary.

FIG. 5 is a partial view in cross section, similar to FIG. 2, of another embodiment of the invention which utilizes a series of electric heating rods 71 instead of burner means 13. Rods 71 are positioned between tube plate 25 and fan propeller 27.

An important advantage of the tempering apparatus and oven of the present invention is that any size or combination of sizes of glass sheets may be run, and the device automatically adjusts for the various sizes of glass sheets so that they are all heated to the proper tempering temperature. This happens because the system is based on blowing air of a certain temperature, no matter what size glass sheet is in the oven. When the air in the oven becomes cooler, the sensor turns the burner up to restore the air to the proper temperature.

It is to be understood that the form of the invention herewith shown and described is to be taken as a presently preferred embodiment. Various changes may be made in the shape, size and arrangement of parts. For example, equivalent elements may be substituted for those illustrated and described herein, parts may be reversed, and certain features of the invention may be utilized independently of the use of other features, all without departing from the spirit or scope of the invention as defined in the subjoined claims.

What is claimed is:

1. An oven for heating glass to a tempering temperature, comprising an enclosed casing structure, means for suspending a sheet of glass vertically within said casing structure, burner means mounted in the casing structure for generating heat therein, and current means within the casing structure for generating forced air currents which are heated by said burner means, duct means mounted forwardly of said current means for directing the heated air forwardly and spaced from the casing structure to provide sufficient space for a return air flow, and jet means spaced uniformly throughout the forward zone of the duct means for applying the heat uniformly to a sheet of glass.

2. The oven defined in claim 1, wherein a temperature control means is provided for sensing the temperature of said heated forced air currents and for regulating the temperature of said currents to insure that the glass sheet is heated evenly across its length and breadth.

3. An oven for heating glass to a tempering temperature, comprising an enclosed casing structure, means for suspending a sheet of glass vertically within said casing structure, burner means mounted in the casing structure for generating heat therein, a pair of opposed plenum chambers mounted in said casing structure and spaced therefrom to provide sufficient space for a return air flow, a tube plate having a multiplicity of tubes mounted on the front of each chamber, and a fan propeller rotatably mounted in the rear of each plenum chamber for forcing air currents, heated by said burner means, through said tubes to impinge upon and apply heat uniformly to a sheet of glass positioned between said tube plates, said air currents leaving said glass to follow a return path, weaving between the tubes and then past said burner means, to be re-heated and forced again by said fan propellers through said tubes.

4. The oven defined in claim 3, which includes a heat sensor positioned in at least one of said plenum chambers, a fuel line connected to each burner means, a temperature control valve connected in the fuel line, and a temperature controller connected between said sensor and said temperature control valve, said controller being responsive to said sensor to actuate the temperature control valve to regulate the temperature of the air passing through the plenum chambers by increasing and decreasing the amount of fuel fed to the burners.

5. An oven for heating glass to a tempering temperature for producing tempered glass, comprising an enclosed casing structure having interior insulating material top, bottom, front, rear, and side walls, a plurality of burners mounted in the front and rear walls, four pairs of opposed plenum chambers mounted in the casing structure and spaced therefrom to provide sufficient space for a return air flow and mounted so as to face a common plane, a fan propeller rotatably mounted in the rear of each plenum chamber, a tube plate having a multiplicity of tubes mounted on the front of each chamber, an entrance slot forced in the center of one side wall and an exit slot formed in the center of the other side wall, a conveyor track suspended from the top of the casing structure, a movable rack supported by said track and having tongs extending therefrom adapted to grasp and hold in suspension a sheet of glass, pusher mechanism for pushing the rack and glass sheet into and out of the oven with uniform acceleration and deceleration, a heat sensor positioned within a plenum chamber of each set of opposed chambers, a fuel line connected to each burner and a temperature control valve connected in the fuel line, a temperature controller connected between said sensor and said temperature control valve for individually regulating the temperature of air passing through each set of opposed plenum chambers to insure an even temperature on each side of the glass sheet being heated in the oven, whereby a glass sheet is suspended from the tongs and moved into the oven through the entrance slot and subjected to an even heat from air which is forced by the fan propellers through the plenum chambers and tubes to strike the glass sheet in a uniform fashion, said air bouncing from the glass sheet and returning to the rear of the plenum chambers, and being reheated while flowing in its return path, to again be projected by said fan propellers through the plenum chambers and tubes to strike and heat the glass sheet, said glass sheet being moved out of the oven through the exit slot by the pusher mechanism after the glass sheet has been heated to the proper temperature.

6. Apparatus for tempering a glass sheet, comprising a conveyor track, a plurality of racks which ride along the conveyor track and have means for carrying a sheet of glass, a loading station at one end of the conveyor track where a sheet of glass is attached to one of the racks, an oven station next to the loading station wherein the sheet of glass is heated to a tempering temperature, a quenching station next to the oven station wherein the heated glass is suddenly chilled by cool air which is applied thereto, an unloading station next to the quenching station wherein the glass sheet is removed from the rack, pusher means for pushing the racks from one station to the next along the conveyor track, a return conveyor which is of the power-driven endless-chain type, a crossover conveyor extending between the unloading station and one end of the return conveyor, and another crossover conveyor extending between the other end of the return conveyor and the loading station.

7. The apparatus defined in claim 6, wherein said pusher means includes a crank and a pusher arm for pushing the racks from station to station with nearly uniform acceleration and deceleration in order to avoid distortion caused by severe acceleration or deceleration forces.

8. Apparatus for tempering a glass sheet, comprising a conveyor track, a plurality of racks which ride along the conveyor track and have means for carrying a sheet of glass, a loading station at one end of the conveyor track where a sheet of glass is attached to one of the racks, an oven station next to the loading station, wherein the sheet of glass is heated to a tempering temperature, said oven station including an oven having an enclosed casing structure, means for suspending a sheet of glass vertically within said casing structure, burner means mounted in the casing structure for generating heat therein, and current means within the casing structure for generating forced air currents which are heated by said burner means, duct means mounted forwardly of said current means for directing the heated air forwardly and spaced from the casing structure to provide sufficient space for a return air flow, jet means spaced uniformly throughout the forward zone of the duct means for applying the heat uniformly to a sheet of glass, a quenching station next to the oven wherein the heated glass is suddenly chilled by cool air which is applied thereto, an unloading station next to the quenching station wherein the glass sheet is removed from the rack, and pusher means for pushing the racks from one station to the next along the conveyor track.

9. Apparatus for tempering a glass sheet, comprising a conveyor track, a plurality of racks which ride along the conveyor track and have means for carrying a sheet of glass, a loading station at one end of the conveyor track where a sheet of glass is attached to one of the racks, an oven station next to the loading station wherein the sheet of glass is heated to a tempering temperature, said oven station including an oven having an enclosed casing structure, means for suspending a sheet of glass vertically within said casing structure, burner means mounted in the casing structure for generating heat therein, current means within the casing structure for generating forced air currents which are heated by said burner means, duct means mounted forwardly of said current means for directing the heated air forwardly and spaced from the casing structure to provide sufficient space for a return air flow, jet means spaced uniformly throughout the forward zone of the duct means for applying the heat uniformly to a sheet of glass, and heat sensor and temperature controller means with the heat sensor positioned in the path of said heated forced air currents for regulating the temperature of said currents to insure that the glass sheet is heated evenly across its length and breadth, a quenching station next to the oven station wherein the heated glass is suddenly chilled by cool air which is applied thereto, an unloading station next to the quenching station wherein the glass sheet is removed from the rack, and pusher means for pushing the racks from one station to the next along the conveyor track, said pusher means including a crank and a pusher arm for pushing the racks from station to station with uniform acceleration and deceleration in order to avoid distortions caused by violent forces of acceleration or deceleration acting on the plastic glass.

10. Apparatus for tempering a glass sheet, comprising a conveyor track, a plurality of racks which ride along the conveyor track and have means for carrying a sheet of glass, a loading station at one end of the conveyor track where a sheet of glass is attached to one of the racks, an oven station next to the unloading station wherein the sheet of glass is heated to a tempering temperature, said oven station including an oven having an enclosed casing structure, means for suspending a sheet of glass vertically within said casing structure, burner means mounted in the casing structure for generating heat thereon, a pair of opposed and spaced apart plenum chambers mounted in said casing structure and spaced therefrom to provide sufficient space for a return air flow, a tube plate having a multiplicity of tubes mounted on the front of each chamber, and a fan propeller rotatably mounted in the rear of each plenum chamber for forcing air currents, heated by said burner means, through said tubes to impinge upon and apply heat uniformly to a sheet of glass positioned between said tube plates to heat the glass to a tempering temperature, said air currents leaving said glass to follow a return path past said burner means to be re-heated and forced again by said fan propellers through said tubes, a quenching station next to the oven station wherein the heated glass is suddenly chilled by cool air which is applied thereto, an unloading station next to the quenching station wherein the glass sheet is removed from the rack, and pusher means for pushing the racks from one station to the next along the conveyor track.

11. The apparatus defined in claim 10 which includes a heat sensor positioned in at least one of said plenum chambers, a fuel line connected to each burner means, a temperature control valve connected in the fuel line, and a temperature controller connected between said sensor and said temperature control valve, said controller being responsive to said sensor to actuate the temperature control valve to regulate the temperature of the air passing through the plenum chambers by increasing and decreasing the amount of fuel fed to the burners.

12. In an oven, an enclosed casing structure, means for suspending a sheet of glass vertically within said casing structure, at least one pair of opposed plenum chambers mounted within said casing structure and spaced therefrom to provide sufficient space for a return air flow and closed at their facing ends by tube plates having regularly spaced apart elongated tubes mounted thereon, current means for feeding heated air to the plenum chambers in such a manner as to produce a uniform flow of air in each tube, and means for controlling the temperature of the air in each tube so that the temperature in each tube is the same at any given moment, whereby each portion of a glass plate suspended between opposed tube plates receives the same volume of air per second at the same temperature.

13. The apparatus defined in calim 12, wherein is provided a heat source mounted in said casing structure near the plenum chambers for generating heat, and said current means includes a fan propeller rotatably mounted in the rear of each plenum chamber for forcing heated air through said tubes to heat the glass plate to a tempering temperature.

14. The apparatus defined in claim 13, wherein said heat source is a burner.

15. The apparatus defined in claim 12, wherein is provided burner means mounted near the plenum chambers for generating heat, a heat sensor positioned between the heat source and the tube plate of at least one of the plenum chambers, a fuel line connected to each burner means, a temperature control valve connected in the fuel line, and a temperature controller connected between said sensor and said temperature control valve, said controller being responsive to said sensor to actuate the temperature control valve to regulate the temperature of the air passing through the plenum chambers by increasing and decreasing the amount of fuel fed to the burners.

16. The apparatus defined in claim 12, wherein is provided two pairs of opposed plenum chambers which are grouped together and mounted so as to face a common plane, each chamber includes a hood which extends rearwardly from the tube plates, and a fan propeller rotatably mounted in the rear of each plenum chamber adapted to force hot air through the tubes.

17. The apparatus defined in claim 13, wherein said heat source is a series of electric heating elements positioned between tube plate and fan propeller.

References Cited
UNITED STATES PATENTS

| | | | |
|---|---|---|---|
| 760,825 | 12/1903 | Uehling | 65—181 |
| 2,841,925 | 7/1958 | McMaster | 263—8 |
| 3,259,480 | 7/1966 | Michalik et al. | 65—350 |

DONALL H. SYLVESTER, *Primary Examiner.*

A. D. KELLOGG, *Assistant Examiner.*